United States Patent [19]

Kleefeld

[11] Patent Number: 5,307,797
[45] Date of Patent: May 3, 1994

[54] PORTABLE GRILL

[76] Inventor: Klaus Kleefeld, Mt. Tom Rd., RD 2; Box 554, Pawling, N.Y. 12564

[21] Appl. No.: 794,876

[22] Filed: Nov. 19, 1991

[51] Int. Cl.⁵ ............................................. F24B 3/00
[52] U.S. Cl. ..................... 126/30; 248/125; 403/346
[58] Field of Search ............ 126/29, 25 A, 30, 505, 126/506; 248/125, 156, 545; 99/421 HV, 449; 108/29, 233; 403/233, 373, 236, 346

[56] References Cited

U.S. PATENT DOCUMENTS

| | | | |
|---|---|---|---|
| 950,043 | 2/1910 | Gierding | 126/30 X |
| 1,397,453 | 11/1921 | Rekar | 248/125 |
| 1,423,612 | 7/1922 | Jewett | 126/30 |
| 2,173,024 | 9/1939 | Park | 126/30 |
| 2,522,223 | 9/1950 | Hardin et al. | 126/30 X |
| 2,827,846 | 3/1958 | Karkling | 126/25 R |
| 2,940,439 | 6/1960 | Bartels et al. | 126/25 A |
| 2,960,979 | 11/1960 | Stonez | 126/30 X |
| 2,977,953 | 4/1961 | Dowdy | 126/30 |
| 3,045,660 | 7/1962 | Manely et al. | 126/30 |
| 3,064,933 | 11/1962 | Brasty | 248/125 X |
| 3,079,119 | 2/1963 | Brooks | 248/156 X |
| 3,162,113 | 12/1964 | Tallaksen | 126/30 X |
| 3,181,453 | 5/1965 | Moran | 99/449 X |
| 3,195,531 | 7/1965 | Groff | 126/30 |
| 3,358,952 | 12/1967 | Burns | 248/156 X |
| 3,381,824 | 5/1968 | Blumenscheiu | 248/125 X |
| 3,483,816 | 12/1969 | Lomandi | 126/30 X |
| 4,083,354 | 4/1978 | Claire et al. | 126/30 |
| 4,625,634 | 12/1986 | Kruper | 99/449 X |

FOREIGN PATENT DOCUMENTS

| | | | |
|---|---|---|---|
| 526739 | 3/1954 | Belgium . | |
| 420534 | 3/1967 | Switzerland | 99/421 HV |

Primary Examiner—Carl D. Price
Attorney, Agent, or Firm—Joseph L. Spiegel; Joseph B. Taphorn

[57] ABSTRACT

A portable outdoor grill includes a round, smooth stake having a T-shaped upper end to facilitate insertion and removal from the ground. An E-shaped double-hook having at each end a hook making contact with the post at two separated points, mounts on its external side a sleeve that slidably receives a horizontal arm. One end of the arm is for mounting a cooking utensil over a source of heat, and the other end mounts a wooden handle. The cooking utensil may be a wire basket having a wire lid allowing cooking of the other side of the food on rotation of the basket; two lid levers embracing the arm preclude opening of the lid on rotation of the basket. The basket may be replaced a Y-shaped bar whose branches have arcuate shapes providing three-point support for a range of differently sized cookware.

1 Claim, 3 Drawing Sheets

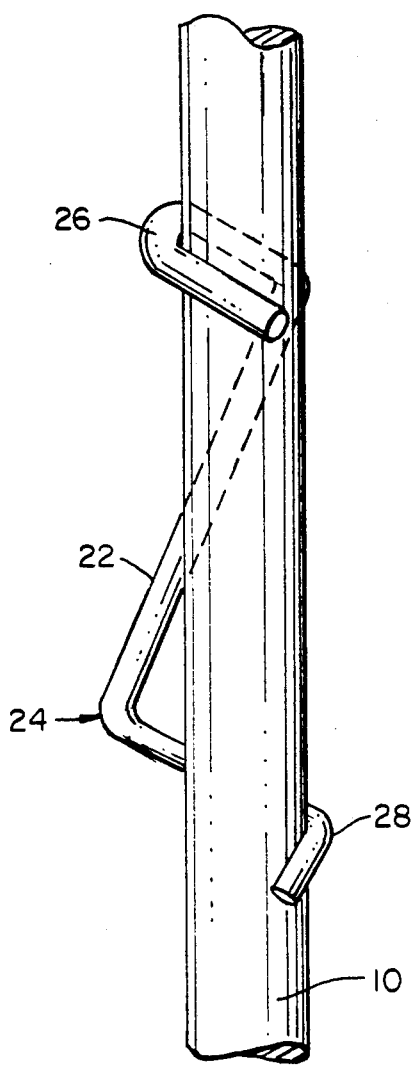
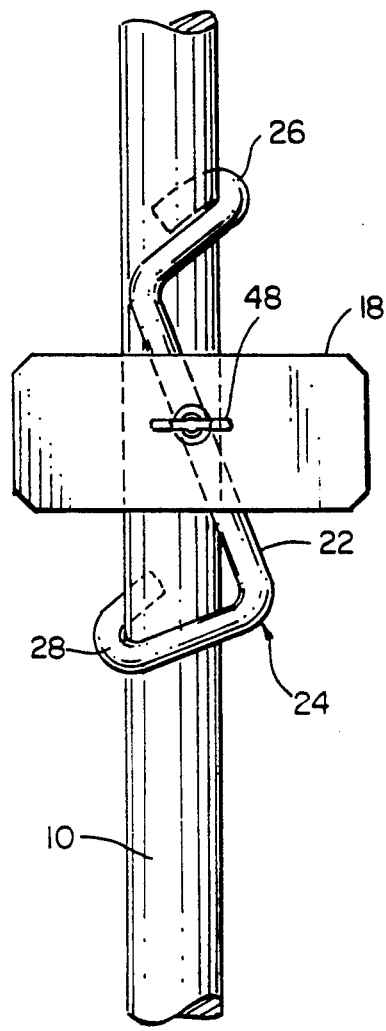
FIG. 3  FIG. 4
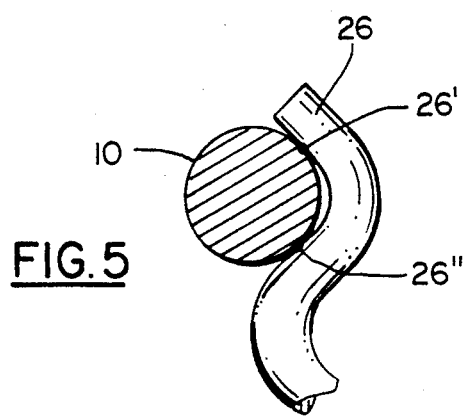
FIG. 5

PORTABLE GRILL

INTRODUCTION

1. Field of the Invention

This invention relates to portable grills, and more particularly to a simplified grill wherein a cooking utensil such as a wire-basket broiler can be readily rotated three hundred and sixty degrees about both a horizontal and a vertical axis and translated vertically and laterally, and the broiler can be easily replaced by a three-point cook-ware holder.

2. Prior Art

The prior art includes the U.S. Pat. Nos. issued to Jewett (1,423,612), Park (2,173,024), Karkling (2,827,846), Bartels et al (2,940,439), Stone (2,960,979), Dowdy (2,977,953), Manely et al (3,045,660), Tallaksen (3,162,113), Groff (3,195,531); and Belgian patent issued to Coudron (526,739). Jewett shows a camp utensil wherein a single stake supports a plurality of utensils via collars fixed to the stake by set screws and supporting swivelled heads mounting utensil holding arms having at their free ends various devices for holding different utensils. Park shows a portable cooking utensil stand wherein a post supports a number of cooking utensils by various means. Karkling shows a portable food preparing device wherein a stake supports a vertically adjustable and laterally swingable fire box or a pan and a griddle. Bartels et al shows a portable grill wherein a stake supports a grill and a pan via arms fixed to tubes rotatably mounted on the stake and held in a selected vertical position by a collar adjustably fixed to the stake. Stone shows a fire place cooking apparatus wherein a post fixed between the floor and the roof of the fireplace mounts a plurality of utensils by sets of two frictional rigid hooks, one hook embracing the back of the post and the other the front to hold a given cooking utensil at a desired height. Dowdy shows a portable grill wherein a stake mounts a sleeve carrying a set screw and a pair of aligned vertical bearings accommodating swinging movement of a grid. Manley et al shows a picnic grill wherein a stake supports two coplanar grill members pivotable between a horizontal position and a raised, vertical position through an arcuate bracket having a pair of ears mounted on a pivot pin in the stake. Tallaksen shows an adjustable grill unit wherein a post of rectangular cross-section supports a grill via a handle received in a channel in a bracket having a rectangular opening embracing the post and providing a twisting action binding the bracket to the post. Groff shows an outdoor cooking appliance wherein a grill is attached to a stake through a sidewise slotted connector having upper forwardly-extending and lower rearwardly=extending tabs received respectively in upper rearwardly=opening and lower forwardly-opening notches cut in the stake. Coudron shows a wire connector for attaching an element of an object to a stake.

SUMMARY OF THE INVENTION

Accordingly, it is an object of the invention to provide a grill wherein the cooking utensil can be readily swung laterally and rotated about a horizontal axis during cooking operations, and without engaging heated elements.

A further object of the invention is to provide a grill which can readily be translated vertically without engaging heated elements.

A still further object of the invention is to provide a simple means enabling said swinging laterally and rotation about a horizontal axis and said translation vertically movements.

Another object of the invention is to provide such a grill wherein a cooking utensil such as an enclosed wire basket may be readily replaced with a three-point support for other cookware such as pots and pans.

A yet further object of the invention is to provide a three-point support for cookware that can accommodate a range of cookware sizes and shapes.

Yet another object of the invention is to provide a grill which is easy to maintain and keep clean.

Still another object of the invention is to provide a grill which is light in weight, yet strong, and easily transported.

A further object of the invention is to provide a grill which is easy to set up and facile in use.

Still another object of the invention is to provide a grill which is simple of construction and inexpensive of manufacture.

An additional object of the invention is to provide a grill which is compact in the disassembled state and readily stored.

The objects of the invention are achieved through a double-hook and sleeve assembly by which a hollow metal arm for holding the cooking utensil is mounted on a vertical stake or post for swinging movement to and from over a fire and for rotational movement of the utensil over the fire. The double-hook, of a strong metal, has V-shaped end hooks having at their bends a lessor radius that the that of the stake so that two points of contact occur between the shaft and each hook. The double-hook has a diagonal midportion that is fixed to the outside of a sleeve in which the arm is slideably and rotatably received and securable thereto at a selected extension and angle of rotation by a thumb set screw. The upper and lower ends of the double-hook, that is the end hooks, extend laterally away from the sleeve, with lower one of them engaging the front of the stake facing the downward and backward torque (about the upper hook) resulting from the cantilevered weight of the cooking utensil while the upper one engages the back of the stake facing an upward and forward torque (about the lower hook). The end of the arm to which a cooking utensil is secured mounts a pin to limit its insertion in a horizontal receiving block secured to supporting bars for a wire basket. Both the end of the arm and the block are formed with aligned aperatures in which a standard hitch pin is inserted to secure the two in one rigid structure; the pin limiting insertion also facillating alignment of the arm aperature with the block aperture. Levers from the lid of the basket extend along side the arm and terminate in downward and inturned portions which rest below the arm and require outward displacement to move the lid; the inturned portions being coated with a plastic to additionally protect against corrosion. A wooden handle at the other end of the arm allows heat-free maneuvering of the arm and cooking utensil within the sleeve and about and up and down the stake. If the basket is disconnected as by lifting the hitch pin, a Y-shaped bar, slightly dish-shaped to provide a range of three points or platforms, has an apertured loop at the end of one leg of the bar which may be received on the reduced end of the arm and secured thereto by the hitch pin to provide a support for cookware of varying sizes.

BRIEF DESCRIPTION OF THE DRAWINGS

These and other objects, features, and advantages of the invention will become apparent from a reading of the following description of a preferred embodiment of the invention, when considered with the appended drawings, wherein:

FIG. 3 is a somewhat enlarged side view, as seen from the back in FIGS. 1 and 2, of a portion of the stake, the double hook, and receiving arm sleeve;

FIG. 4 is an even further enlarged side view, as seen from the front in FIGS. 1 and 2, of a portion of the stake, and the E-shaped double hook;

FIG. 5 is a top view of the stake and a portion of the double hook seen in FIG. 3;

DETAILED DESCRIPTION OF A PREFERRED EMBODIMENT OF THE INVENTION

Figure 1:
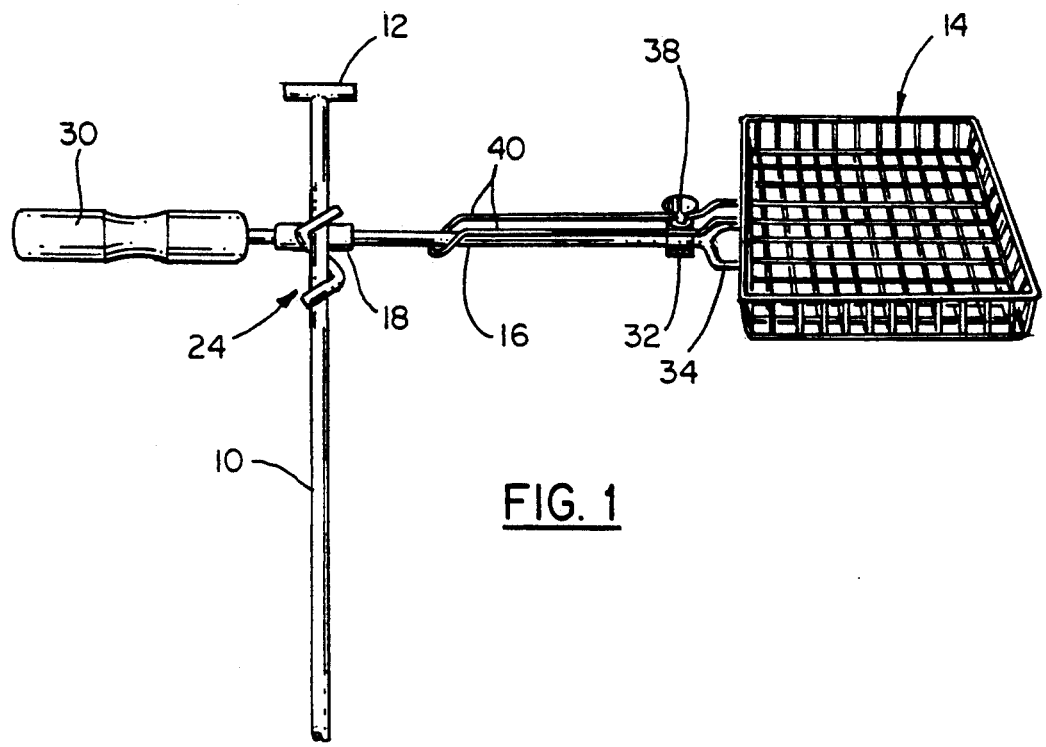
FIG. 1 is a view in perspective of an installed grill according to the invention, mounting a wire basket.

Referring now more particularly to the drawings, FIG. 1 shows a round, smooth stake 10 or post vertically implanted via its pointed end (not shown) in the ground. The upper end of the stake is formed with a T-shape 12 to facilitate removal of the stake from the ground.

Figure 6:
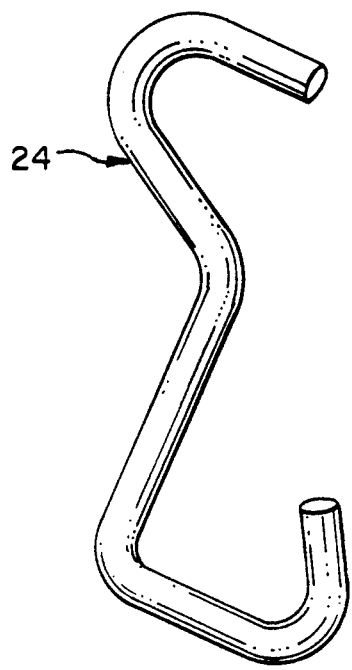
FIG. 6 is an enlarged side view of the double-hook as seen from another angle.
Figure 7:
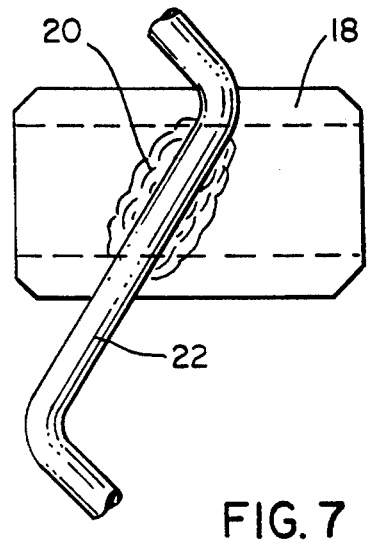
FIG. 7 is another side view of a portion of the double-hook and showing how it is welded to the receiving arm sleeve.
Figure 8:
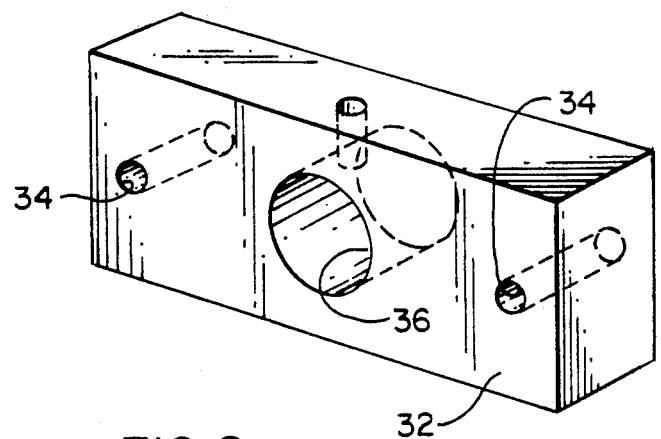
FIG. 8 is an enlarged view in perspective of the receiving block of the wire-basket broiler.

A wire basket, generally indicated by the numeral 14, is shown as mounted on the stake via a cantilevered arm 16. The arm 16 is slidably and rotatably received in a sleeve 18 which has welded to it as at 20 (FIG. 7) a diagonal portion 22 of an E-shaped double-hook generally indicated by the numeral 24 (FIG. 6).

The E-shaped double-hook 24 includes a V-shaped upper hook 26 and a V-shaped lower hook 28, both of which extend laterally away from the sleeve 18 and are spaced apart a distance sufficient to allow the double-hook, when tilted, to have its diagonal portion 22 approach the stake 10 so that the end hooks 26 and 28 engage the stake when the tilted double-hook is restored to its normal position in which the sleeve 18 is generally parallel to the ground.

Each of the V-shaped hooks 26 and 28 is so designed that it makes contact the stake at two points. As may be best seen in FIG. 5, the radius of the bend in the hook 26 is less than that of the stake 10 so that the hook 26 contacts the stake 10 at two points, 26' and 26". This results in additional friction between the E-shaped double-hook 24 and the round, smooth stake 10 sufficient to allow the double-hook 24 to withstand downward displacement under the loads that may be placed in a cooking utensil such as the broiler 14. It does not, however, result in significant friction resisting turning of the double-hook 24 on the stake 10, so that the double-hook 24, the sleeve 18, the arm 16 and the broiler 14 may be easily swung, without suffering downward displacement, over and away from any hot coals used for heating the food.

A handle 30, of wood or other material having low thermal conductivity, is secured to the left-hand end (as seen in FIG. 1) of the arm 16, and is of a diameter to provide good control over the broiler 14. By grasping it and pulling or pushing, the arm 16 can be slid within the sleeve 18 so that the cooking utensil is centered over the hot coals. Also turning the handle about the stake 10, the assemblage will freely swing about the stake without suffering vertical displacement. Also by rocking the handle downwards, the sleeve 18 (and arm 16, and broiler 14) and E-shaped double-hook 24 can be cocked upwards to relieve the pressure on the stake contact points such as 26' and 26" to enable verticle displacement in either direction of the broiler 14 with respect to the hot coals. If the assemblage is cocked even more, the free ends of the end hooks 26 and 28 will clear the stake 10 so that the assemblage can be moved laterally to be free of the stake.

Thus it will be appreciated that applicant has provided a simple means for mounting a cantilevered beam, arm 16, on a vertical post. Further that the means, and hence the arm, can be readily mounted on the post by just cocking the means to where the hooks are lined-up ahead of the front and behind the back of the post and then moving the means laterally to where the hooks are directly in front of and behind the post and then uncocking the means. Dismounting can be effected by cocking the means to where the free ends of the hooks are ahead of and behind the post and then laterally displacing the means.

The wire basket 14 is mounted on the arm 16 via a rectangular receiving block 32. Two heavy rods 34 on the bottom of the wire basket extend therefrom and are secured in openings in the block to each side of a central opening 36. The central opening 36 is of a diameter to snugly receive the end of the arm 16 until a spring pin 37, tightly fit into an aperature in the arm 16, engages the block 32. An aperature in block 32 and another aperature in the inserted arm 16 are aligned when the pin 37 is lined-up with the block aperature and receive a loop or hitch pin 38 to secure the block and the arm together.

A lid 15 on the basket which would have its right hand end (FIG. 1) held on the basket in any conventional manner, would have on its left hand end two laterally extending levers 40. The left hand ends of these levers would extend downwards and towards each other so that they would normally rest below the arm 16 to hold the lid in closed position and would require lateral displacement to free the lid for lifting to open position. Thus the basket can be rotated upside down to allow broiling of the food on the other side, without danger of the food falling out. The left hand ends of the levers are plastic-dipped to provide additional protection against corrosion; the plastic may be of a bright color to enhance attractiveness of the assemblage which may be formed of stainless steel or of other materials including steel that is appropriately plated for appearance and protection.

Figure 2:
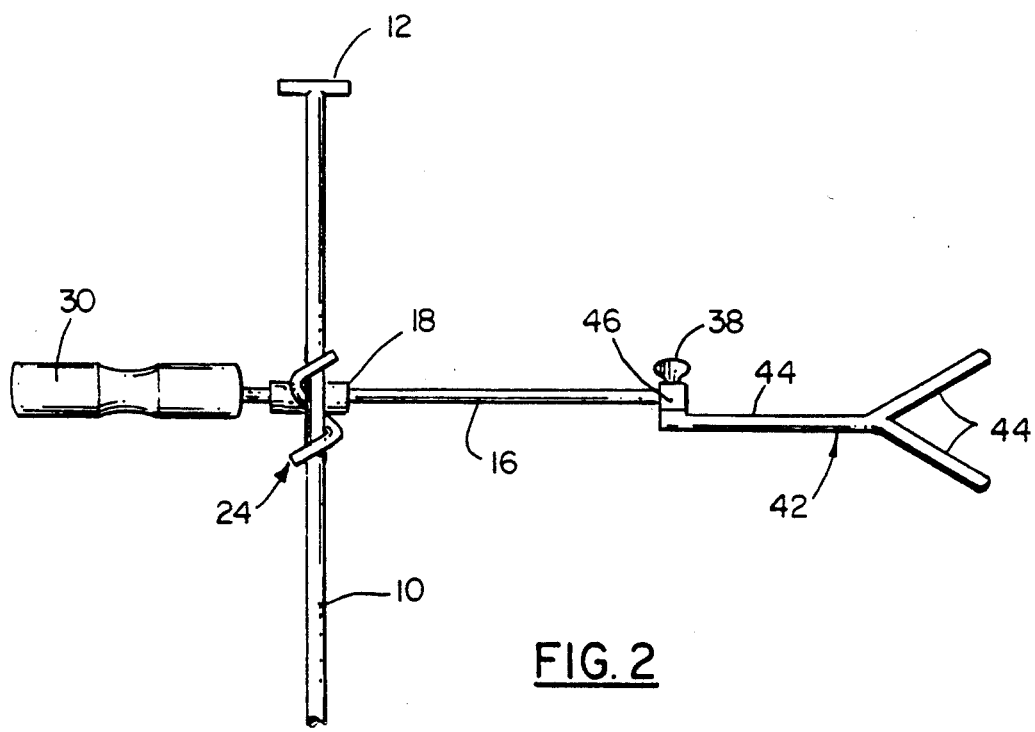
FIG. 2 is a view in perspective of an installed grill according to the invention, mounting a three-point cookware holder.

FIG. 2 shows the wire basket removed and a three-point cookware holder, generally indicated by the numeral 42, substituted in its place. The stake 10, arm 16, and means for mounting the arm on the stake are the same as they were in FIG. 1.

The three-point cookware holder 42 is a generally Y-shaped bar in which the branches 44 arc slightly upwards towards their free ends. This results in a somewhat dish-shaped structure on which any-sized cookware having a relatively flat bottom such as a pan will find three points of contact enabling it to be set upright on the holder 42.

The holder 42 is secured to the arm 16 by a ring 46 welded to the upper side of the end of one of the branches 44. The inside of the ring 46 too is of a diameter to snugly receive the pinned end of the arm 16 and is formed with an aperature that aligns with other aperature in the pinned end to receive the loop or hitch pin 38.

Again the handle 30 would be used to position the cooking utensil 42. Of course the handle would not now be used to rotate the arm 16 within the sleeve 18, as the cookware would fall off of the holder 42, unless some additional securing mechanism were employed. To enable insuring that the arm 16 is not inadvertently rotated in the sleeve 18, a thumb set screw 48 on the sleeve (FIG. 3) may be tightened.

In use, the stake 10 would be driven straight down into the ground. The arm 16 would be inserted, via the handle 30, into the sleeve 18. The appropriate cooking utensil, either the wire basket 14 or the three-point cookware holder 42, would be attached to the free end of the arm 16 by inserting the latter's pinned end into either the receiving block opening 36 or the holder ring 46, and inserting the loop or hitch pin 38 in the aligned aperatures thereof. The arm 16 would now be cooked so that the E-shaped double-hook 42 is disposed so that its end hooks 26 and 28 are clear of the stake 10, and the double-hook 42 moved sideways at a desired height until the diagonal portion 22 of it engaged the stake 10. The arm 16 would now be uncocked to where the hooks 26 and 28 engage the stake 10. If the height of the cooking utensil with respect to the hot coals was unsatisfactory, the arm 16 would be cooked slightly to relieve the pressure on the hooks 26 and 28 and slide them upwards or downwards on the stake 10. The handle 30 could be swung, without uncocking, to move the cooking utensil over or off the coals, the hooks 26 and 28 rotating freely on the stake and without suffering any vertical displacement. The handle would also be pulled or pushed to slide the arm 16 in the sleeve 18 to further position the utensil. If the wire basket 14 was being employed and it was desired to heat the other side of the food after awhile, the handle 30 would be rotated about its longitudinal axis to turn the basket upside down. Any unbalance in the basket could be off-set by tightening the thumb screw 48.

Disassembly would be accomplished by cocking the arm 16 to where the end hooks 26 and 28 of the E-shaped double-hook 24 would clear the stake 10 on lateral displacement of the arm 16 in the sleeve 18. The hitch pin 38 would then be pulled to separate the cooking utensil from the arm 16. The arm 16 could then be withdrawn from the sleeve 18, and the parts packed for travel. The stake 10 would be pulled from the ground, as by grasping its T-shaped upper end.

It will be evident that applicant has provided a grill wherein the cooking utensil can be readily swung laterally and rotated about a horizontal axis during cooking operations, both without engaging any heated elements. All of the operations can be performed just by grasping the wooden handle 30 which has a low thermal conductivity. The low temperature of the handle is abetted by making the arm 16 hollow, which helps make for a light weight grill, about five pounds, too. Since the cooking utensil can be translated vertically just by grasping the handle, this action too can be performed during cooking operations without engaging any heated elements. The hitch pin 38 facilitates quick switching of the cooking utensils, as well as their maintenance and cleaning. The parts of the portable grill are simple to handle and easy to manufacture. Their longitudinal nature enables compact packing making for easy transportation and storage.

While there has been shown and described a preferred embodiment of the invention, it will be apparent to those skilled in the art that other and different applications may be made of the principles of the invention. Accordingly it is intended to be limited only by the spirit or scope of the appended claims.

What is claimed is:

1. A portable grill comprising:
   a post for vertical mounting;
   a longitudinally-extending arm for generally horizontal disposition to support at a first end a cooking utensil over a source of heat and having a low heat conductivity handle at a second end;
   a sleeve for slideably and rotatably receiving said arm; and,
   hook means secured to said sleeve for mounting said arm on said post for swinging and vertical adjustment relative to said post, said hook means including an upper and lower hook having a radius of bend less than that of said post.

* * * * *